(12) United States Patent
Yoshino et al.

(10) Patent No.: US 8,186,467 B2
(45) Date of Patent: May 29, 2012

(54) WHEEL ROTATING DEVICE FOR IN-WHEEL MOTOR VEHICLE

(75) Inventors: Tsutomu Yoshino, Wako (JP); Koichi Oku, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 567 days.

(21) Appl. No.: 12/225,246

(22) PCT Filed: Aug. 31, 2006

(86) PCT No.: PCT/JP2006/317701
§ 371 (c)(1),
(2), (4) Date: Sep. 17, 2008

(87) PCT Pub. No.: WO2007/116541
PCT Pub. Date: Oct. 18, 2007

(65) Prior Publication Data
US 2009/0166112 A1 Jul. 2, 2009

(30) Foreign Application Priority Data
Mar. 31, 2006 (JP) .................. 2006-096223

(51) Int. Cl.
*B60K 7/00* (2006.01)
(52) U.S. Cl. .................. 180/65.51; 180/65.6; 903/910; 475/5
(58) Field of Classification Search ......... 180/65.51, 180/65.6, 65.7; 903/909, 910; 475/4, 5, 475/10
See application file for complete search history.

(56) References Cited

U.S. PATENT DOCUMENTS

| | | | | |
|---|---|---|---|---|
| 5,382,854 A | * | 1/1995 | Kawamoto et al. | 310/67 R |
| 6,974,399 B2 | * | 12/2005 | Lo | 475/5 |
| 7,214,155 B2 | * | 5/2007 | Mueller et al. | 475/5 |
| 7,556,580 B2 | * | 7/2009 | Saito et al. | 475/154 |

FOREIGN PATENT DOCUMENTS

| | | |
|---|---|---|
| EP | 0 528 235 A1 | 2/1993 |
| EP | 1 560 315 A2 | 8/2005 |
| JP | 08-289501 | 11/1996 |
| JP | 2004-114858 | 4/2004 |
| JP | 2005-199879 A | 7/2005 |
| JP | 2006-015785 A | 1/2006 |

OTHER PUBLICATIONS

Japanese Office Action application No. 2006-096223 issued on Nov. 2, 2006.

* cited by examiner

*Primary Examiner* — John Walters
(74) *Attorney, Agent, or Firm* — Squire Sanders (US) LLP

(57) ABSTRACT

A wheel rotating device (1) for an in-wheel motor vehicle includes a motor (2), a speed reducer (6) coupled to an output part of the motor (2), a hub (4) coupled to an output part of the speed reducer (6), and a spindle (5) fixed relative to a vehicle body and supporting the hub (4) in a manner that permits the hub (4) to rotate. The hub (4) is coupled to a wheel (13) to rotate the wheel (13). A stator (21) of the motor (2) is disposed inwardly in radial directions of the wheel (13) along an inner circumferential surface of the wheel (13). A rotor (22) of the motor (2) is disposed inwardly in radial directions of the stator (21). The speed reducer (6) is disposed between the rotor (22) and the hub (4) with bearings provided between the speed reducer (6) and the hub (4).

10 Claims, 9 Drawing Sheets

WHEEL ROTATING DEVICE FOR IN-WHEEL MOTOR VEHICLE

TECHNICAL FIELD

This invention relates generally to a wheel rotating device for an in-wheel motor vehicle, and particularly to a wheel rotating device for an in-wheel motor vehicle in which a motor, a speed reducer and other driving systems are packed compactly.

BACKGROUND ART

Driving mechanisms of the in-wheel motor vehicle fall into two broad categories: a mechanism for a direct drive motor (Direct drive motor scheme) and a mechanism for a geared motor (Geared motor scheme). The direct drive motor scheme, in which an output shaft of a motor is directly coupled to a drive shaft (hub) of a wheel, includes no speed reducer, and thus can be designed with a small number of parts and to have a reduced weight. The geared motor scheme, in which a speed reducer is provided to reduce the speed with which an output of the motor is transmitted to a drive shaft of a wheel, can increase the torque of the motor using the speed reducer, and thus can be designed to have an increased output efficiency so as to improve the dynamics of the vehicle while keeping the motor smaller in size.

The direct drive motor scheme, in which the torque is increased by providing a longer torque arm in the motor, would disadvantageously require a motor larger in size and impair the output efficiency and the dynamics of the vehicle.

On the other hand, the geared motor scheme, in which a speed reducer is placed between the wheel and the motor, would disadvantageously require a space for accommodating the speed reducer and accessorial devices for supplying gear oil, thus impeding the miniaturization of the motor as a whole.

For example, the in-wheel motor as disclosed in JP 8-289501 A and JP 2004-114858 A has a relatively great dimension in an axial direction of a wheel, and the motor is designed to project from the wheel. If the in-wheel motor designed to have the motor or other components projecting from the wheel is used as a steerable wheel, the mechanism for use in steering operation could possibly interfere with the motor or other components that project from the wheel. In addition, a portion projecting from the wheel would occupy a space within the vehicle, and thus would reduce the greatest intended advantage of increased available space within the vehicle.

The present invention has been made against this backdrop. It would be desirable to provide a wheel rotating device for an in-wheel motor vehicle, in which a motor, a speed reducer and other driving systems are packed compactly so that an available space within the vehicle can be as large as possible.

DISCLOSURE OF INVENTION

In one aspect of the present invention, there is provided a wheel rotating device for an in-wheel motor vehicle, comprising: a motor including a stator and a rotor, to generate a rotating force; a speed reducer coupled to an output part of the motor; a hub coupled to an output part of the speed reducer; and a spindle fixed relative to a vehicle body, and supporting the hub in a manner that permits the hub to rotate. The hub is coupled to a wheel to rotate the wheel, whereby the wheel rotating device generates a driving force. The stator of the motor is disposed inwardly in radial directions of the wheel along an inner circumferential surface of the wheel. The rotor of the motor is disposed inwardly in radial directions of the stator. The speed reducer is disposed between the rotor and the hub with bearings provided between the speed reducer and the hub.

In this arrangement, the rotating force generated by the motor is transmitted through the speed reducer to the hub, so that the motor having a compact body can be designed to have improved output efficiency and improved driving performance (e.g., capacity for rapid acceleration). Since the stator herein is disposed inwardly in radial directions of the wheel (i.e., at the side of the wheel facing toward the center in the directions of radii of the wheel) along an inner circumferential surface of the wheel and the rotor is disposed inwardly in radial directions of the stator, the torque arm of the motor is extended. This arrangement makes it possible to render the motor thinner. Moreover, space near the center of the wheel which may be created by arranging the stator and rotor of the motor along the inner circumferential surface of the wheel may be used to arrange the speed reducer, so that a structural block consisting of the motor and the speed reducer can be made thinner. As a result, the motor and the speed reducer can be completely accommodated in the wheel. The use of such a thinner and larger-diameter motor as proposed by an exemplary embodiment of the present invention not only makes the torque arm longer, but also allows the speed reducer to be located closely between the rotor and the hub, so that sufficient capacity for rapid acceleration can be obtained without so much increasing the speed reduction ratio. As described above, the wheel rotating device consistent with the present invention can achieve a sufficient output performance while realizing a miniaturized and lightweight design of the motor, speed reducer and other driving systems.

In an exemplary embodiment, the above wheel rotating device may be configured such that among the stator, the rotor and the speed reducer, one of a dimension greatest in an axial direction of the motor is smaller in the axial direction than the wheel. In other words, the dimensions of the stator, rotor and speed reducer in the axial direction of the motor may, preferably but not necessarily, be smaller than that of the wheel. This allows the motor and the speed reducer to be easily accommodated in the wheel, which serves to prevent the motor or the reducer from projecting from the wheel, thus enhancing flexibility of suspension geometry design of the vehicle. Thus-enhanced flexibility of suspension geometry design facilitates the application of the in-wheel motor to the steerable wheel, and makes it possible to easily enlarge the available space within the vehicle.

In another exemplary embodiment, alternatively or additionally, the dimensions of the stator, the rotor and the speed reducer in the axial direction of the motor may be substantially equal to one another. In this way, a structural block consisting of the motor and the speed reducer can be made thinner, so that the motor and the speed reducer can be completely accommodated in the wheel with ease.

In yet another exemplary embodiment, alternatively or additionally, the stator, the rotor and the speed reducer may, preferably but not necessarily, be aligned in the radial directions of the wheel. According to this arrangement in which the stator, rotor and speed reducer are not staggered, the whole space occupied by the motor and the speed reducer can be more compact, and the structural block consisting of the motor and the speed reducer can be made thinner, so that the motor and the speed reducer can be completely accommodated in the wheel with increased ease.

In yet another exemplary embodiment, alternatively or additionally, centers in axial directions of the stator, the rotor and the speed reducer, respectively, may, preferably but not necessarily, be substantially in alignment with a center in an axial direction of the wheel. According to this arrangement in which the centers in the axial directions of the stator, the rotor and the speed reducer are substantially in alignment with the center in the axial direction of the wheel, the center of gravity of a structural block consisting chiefly of the motor and the speed reducer in the wheel can be positioned to coincide substantially with the center of gravity of a tire/wheel assembly, so that static and dynamic balance of the drive shaft system of the vehicle can be improved. Consequently, the load placed upon the drive shaft system can be lessened and the oscillations therefrom can be reduced.

In yet another exemplary embodiment, alternatively or additionally, the stator may, preferably but not necessarily, be disposed outwardly in radial directions with respect to a center line between a rotation center line of the wheel and a bead seat line. According to this arrangement in which the stator is disposed outwardly in radial directions with respect to the center line between the rotation center line of the wheel and the bead seat line, the stator may be disposed in a position closer to the inner circumferential surface of the wheel, so that the torque arm can be made longer within the limitation of the wheel diameter.

In yet another exemplary embodiment, alternatively or additionally, the rotor may, preferably but not necessarily, be disposed outwardly in radial directions with respect to a center line between a rotation center line of the wheel and a bead seat line. According to this arrangement in which the rotor is disposed outwardly in radial directions with respect to the center line between the rotation center line of the wheel and the bead seat line, the rotor disposed outwardly in radial directions with respect to the stator, as well as the stator, may be disposed in a position closer to the inner circumferential surface of the wheel, so that the torque arm can be made much longer within the limitation of the wheel diameter.

The above speed reducer provided in the wheel rotating device may, preferably but not necessarily, be one of a planetary gear train, a cycloidal gear reducer and a ball reducer. These types of speed reducer can be accommodated compactly between the rotor and the hub with ease.

In exemplary embodiments where the speed reducer includes a planetary gear train, the planetary gear train may include: an internal gear fixed to a motor case; a sun gear fixed to a rotor and disposed rotatably at an outside of the hub with gear bearings provided between the sun gear and the hub; and planet gears meshing with the sun gear and the internal gear to transmit the rotating force from the rotor to the hub. According to this arrangement in which the internal gear is fixed to the motor case, the sun gear is fixed to the rotor and the rotating force is transmitted through the planet gears to the hub, the rotating force can be transmitted to the hub with a speed reduced by the planetary gear train accommodated compactly between the motor and the hub.

The above spindle provided in the wheel rotating device may, preferably but not necessarily, be coupled to the vehicle body through a knuckle. More specifically, a motor case may be fixed to the knuckle. Suspension systems have various types depending upon vehicles. According to this arrangement in which a drive shaft system characterized by including a knuckle and a spindle is adopted, the knuckle can be replaced without changing the motor, and thus the in-wheel motor consistent with the present invention can be made applicable to various types of suspension systems irrespective of whether the wheel is a steerable wheel or non-steerable driving wheel. The shape and/or position of a joint part of the knuckle can be changed as appropriate, and thus the kingpin angle and/or offset (scrub radius) can be set appropriately according to the requirements varying with the vehicle.

The wheel rotating device consistent with the present invention may be applied to an in wheel motor vehicle in which a motor, a speed reducer and other driving systems are packed compactly so that an available space within the vehicle can be made as large as possible.

The above aspect, other advantages and further features of the present invention will become readily apparent from the following description of exemplary embodiments with reference to accompanying drawings.

MODE(S) FOR CARRYING OUT THE INVENTION

A detailed description will be given of exemplary embodiments of the present invention with reference made to the accompanying drawings where appropriate.

Figure 1:
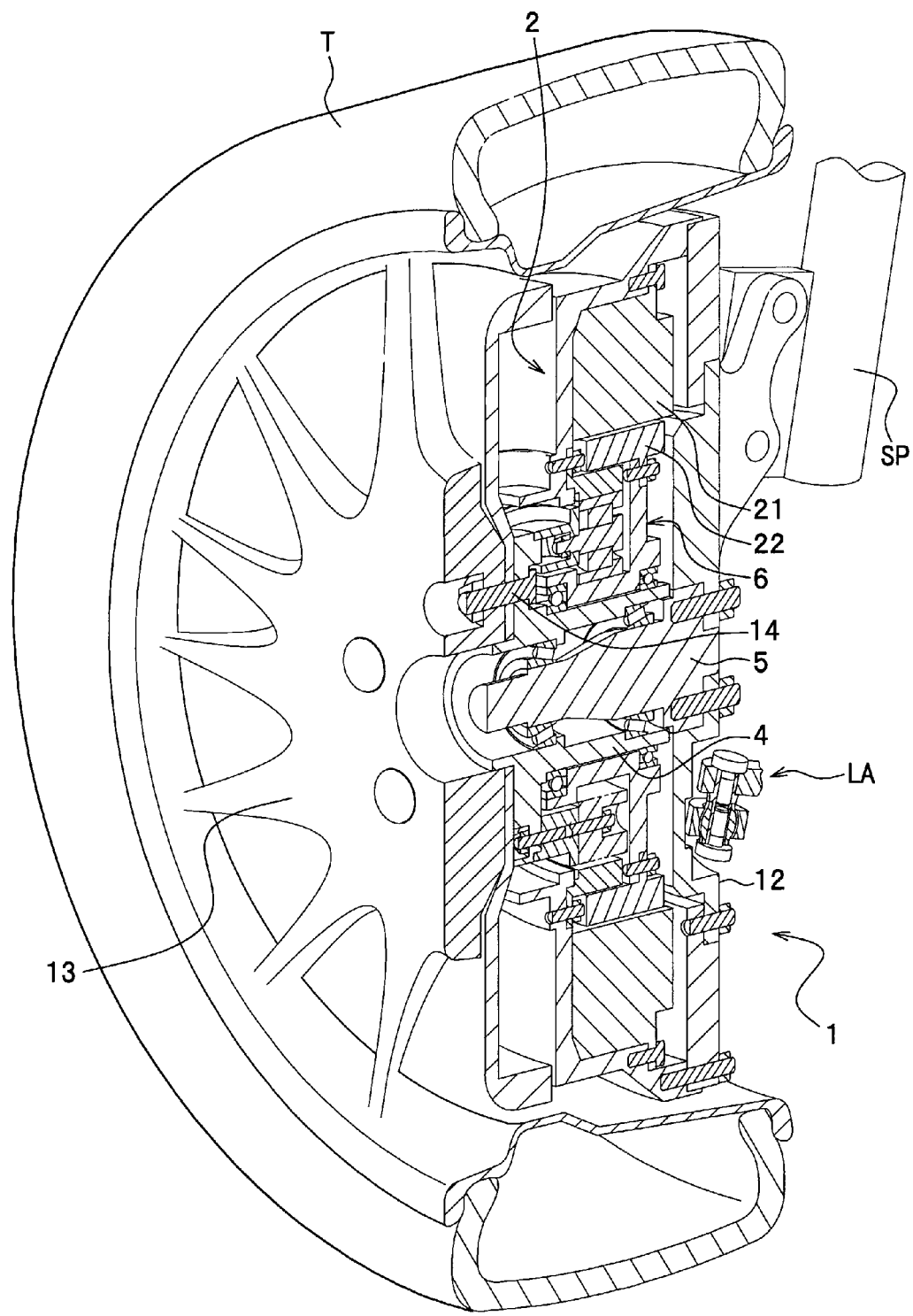
FIG. 1 is a cutaway view, in perspective, showing a wheel rotating device for an in-wheel motor vehicle in its entirety according to an exemplary embodiment of the present invention.

As shown in FIG. 1, a wheel rotating device 1 according to an exemplary embodiment of the present invention includes a motor 2 for generating a rotating force, a planetary gear train 6 that is coupled to an output part of the motor 2, a hub 4 that is coupled to an output part of the planetary gear train 6, and a spindle 5 that is fixed on a knuckle 12 and adapted to support a hub 4 in a manner that permits the hub 4 to rotate. These components of the wheel rotating device 1 are accommodated in a wheel 13.

Figure 2:
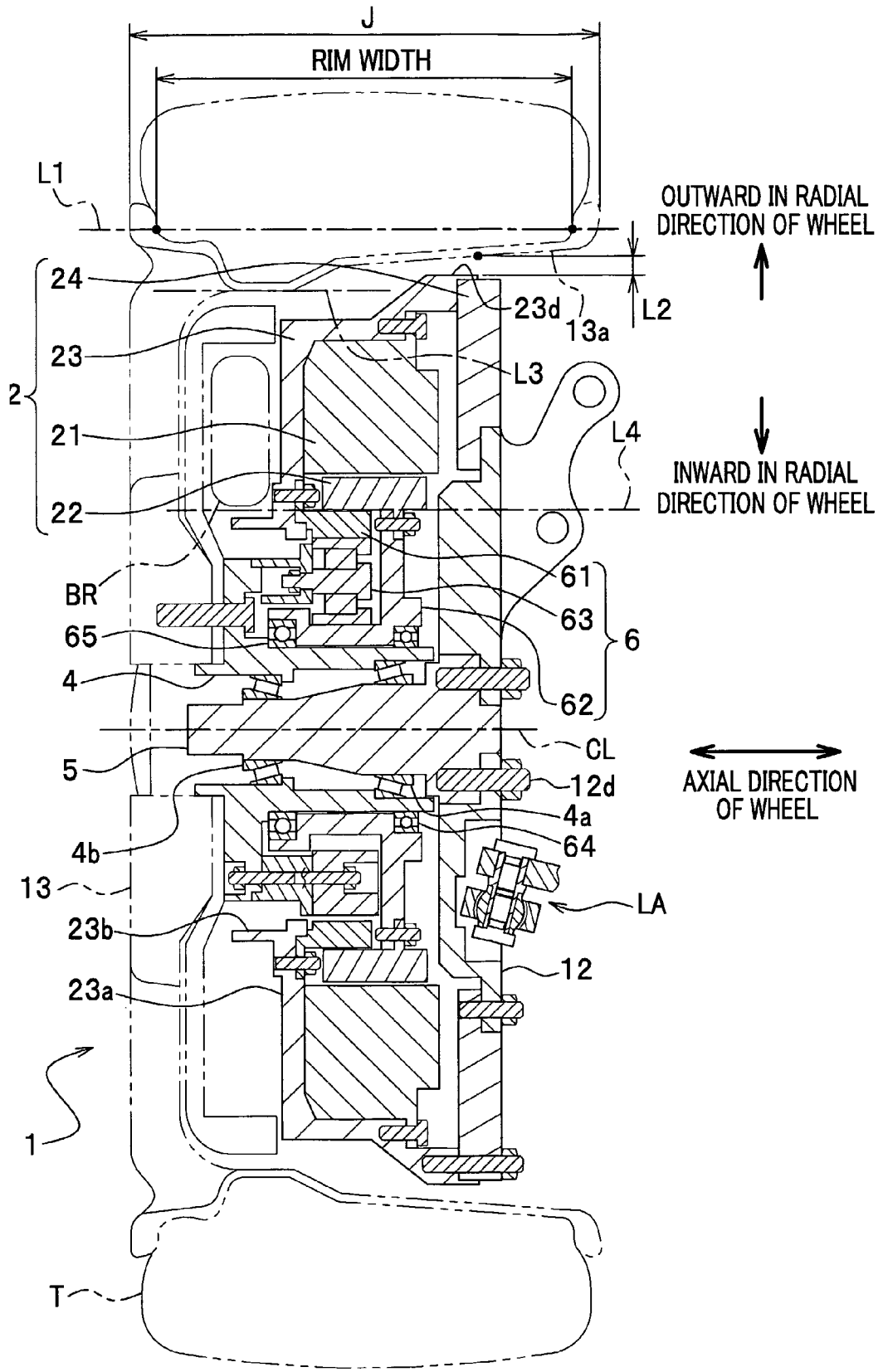
FIG. 2 is a sectional view showing a principal portion of the wheel rotating device of FIG. 1.

To be more specific, as shown in FIG. 2, the motor 2 is disposed along an inner circumferential surface 13a of the wheel 13, as opposed to the inner circumferential surface. Inside of the motor 2 is disposed the planetary gear train 6, and the planetary gear train 6 is coupled to the hub 4. The hub 4 is fitted over the spindle 5 fixed on the knuckle 12 and rotatably supported through hub inner bearings 4a and hub outer bearings 4b.

In the illustrated embodiment, the wheel 13 is of 19 inch in diameter, and a flat tire T is mounted on the wheel 13 by way of example. The wheel rotating device 1 consistent with the present invention may for example be applied to all four wheels, two on the front sides and the other two on the rear sides, of an in-wheel motor vehicle; however, the following discussion will be directed to an exemplified embodiment in which the wheel rotating device 1 is applied to a steerable wheel, for convenience of explanation. It is to be understood that even if the present invention is embodied in a non-steerable driving wheel, the same basic arrangement comprised of motor 2, planetary gear train 6, hub 4, spindle 5 and other components apply to the wheel rotating device 1.

The motor 2 in this embodiment is a synchronous motor including a stator 21 and a rotor 22. Alternating current is supplied to the stator 21 and causes the rotor 22 to rotate. The rotating force generated by the motor 2 is transmitted to the hub 4 with a speed reduced by the planetary gear train 6, and the wheel 13 coupled to the hub 4 is rotated to thereby generate a driving force.

Although a synchronous motor is adopted in the present embodiment, the present invention is not limited thereto; rather, any other types of motor, such as an induction motor or a direct-current motor, may be employed instead. The wheel 13 incorporates a brake mechanism BR. In an axial direction of the wheel 13, disposed inwardly is the wheel rotating device 1, whereas disposed outwardly is the brake mechanism BR. The detailed description of the brake mechanism BR is omitted herein.

Subsequently, the structure of the motor 2 will be described in more detail with reference to FIG. 3.

Figure 3:
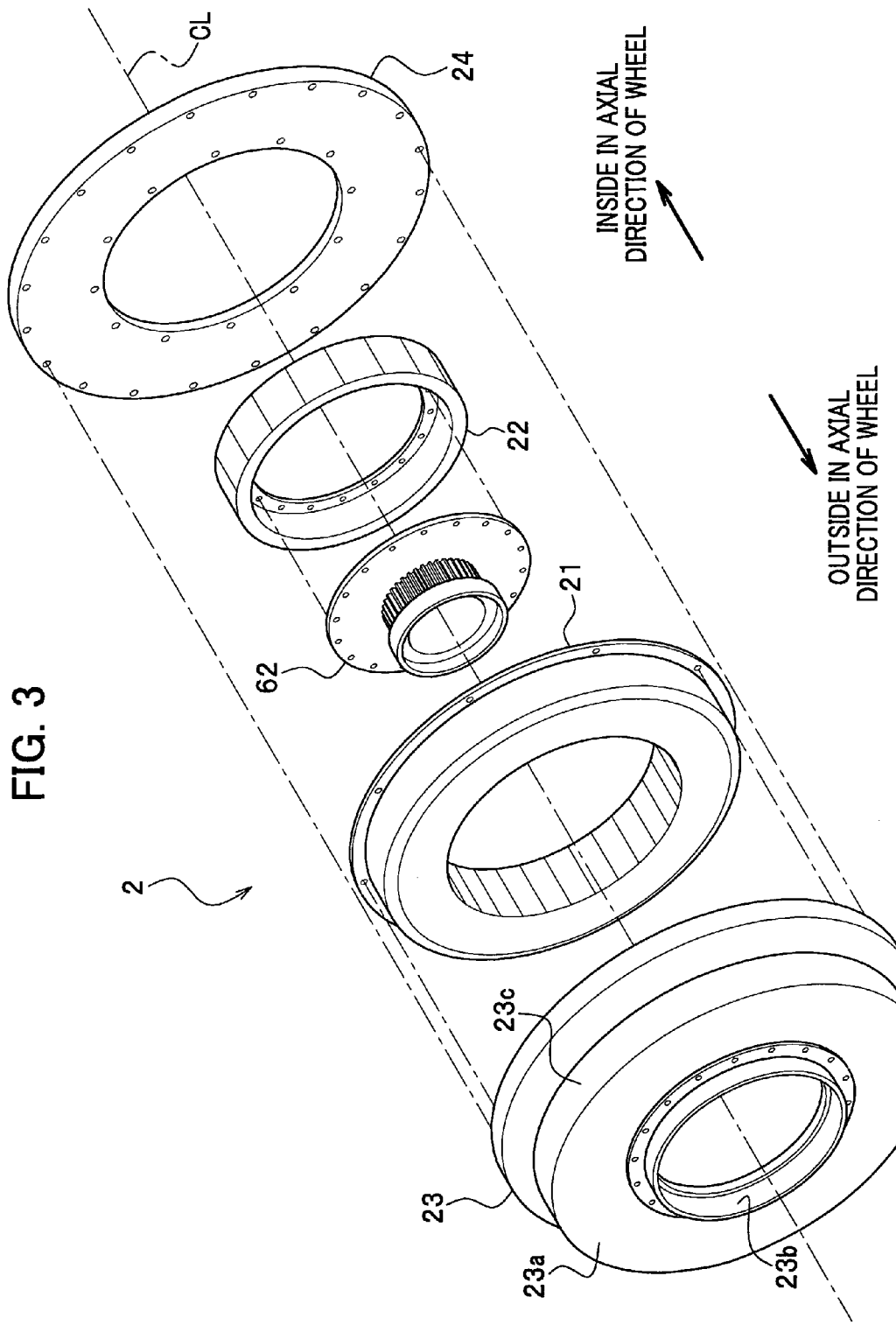
FIG. 3 is an exploded perspective view showing principal components of a motor according to an exemplary embodiment of the present invention.

The motor 2 includes, as shown in FIG. 3, an outer case 23 serving as a housing, and an inner case 24 fitted to an end face positioned inwardly in radial directions of the outer case 23 with the stator 21 and the rotor 22 accommodated between the outer case 23 and the inner case 24. The stator 21 is an annular member fixed along an inner circumferential surface of the outer case 23. The rotor 22 is rotatably disposed inwardly in radial directions of the stator 21. The outer case 23 is shaped like a low-profile bottomed cylinder. A through hole 23b is formed in the center of a bottom plate 23a of the outer case 23. An outer cylindrical surface 23c of the outer case 23 is disposed opposite and adjacent to the inner circumferential surface 13a of the wheel 13 as shown in FIG. 2. The stator 21 is fixed to an inner cylindrical surface of the outer case 23.

The rotor 22 is a cylindrical member made of iron laminated steel plate, permanent magnet or the like. The rotor 22 is fixed to a sun gear 62, and rotatably disposed at an inner cylindrical surface of the stator 21 as shown in FIG. 2. To be more specific, the sun gear 62 is fitted over the hub 4 and rotatably supported through gear inner bearings 64 and gear outer bearings 65, so that the sun gear 62 can rotate about an axis CL of the spindle 5 (hereinafter referred to as "spindle axis CL", see FIG. 7). This point will be further discussed later. The gear inner bearings 64 and the gear outer bearings 65 correspond to "bearings provided between the speed reducer and the hub" as defined in the appended claims.

With this structure of the motor 2, the torque arm (distance between the spindle axis CL as the center of rotation of the rotor 22 and the outer circumference of the rotor 22) can be rendered longer so that a larger output torque is obtained. Since such a thinner and larger-diameter motor 2 as in the present embodiment is adopted, the motor 2 and other components can be completely accommodated within a width J (see FIG. 2) in the axial direction of the wheel 13, and sufficient space for accommodating the brake mechanism BR and a lower arm fastening part can be ensured (see FIG. 2). The phrase "larger-diameter" as used above is intended to mean that the stator 21, the rotor 22 and other components making up the motor 2 are disposed away from the spindle axis CL and closer to a line L1 (see FIG. 2) which defines a rim width of the wheel 13. As shown in FIG. 2, in the present embodiment, not only the stator 21 but also the rotor 22 is disposed outwardly in radial directions with respect to a center line L4 between a bead seat line L3 and the spindle axis CL. Consequently, the torque arm of the motor 2 is rendered much longer. It is however to be understood that the motor 2, depending upon the type of wheel 13 or vehicle to which the present invention is applied, may be arranged to have the stator 21 disposed outwardly but the rotor 22 disposed inwardly in radial directions with respect to the center line L4, and such an arrangement is also deemed to fall within the scope of the present invention. In addition, in the present embodiment, a distance L2 between an edge portion (outer circumferential surface) 23d of the outer case 23 and the inner circumferential surface 13a of the wheel 13 is set as small as to fall within the range of 5 mm to 10 mm or so, and thus the diameter of the motor 2 is rendered larger.

Next, the structure and operation of the planetary gear train will be described with reference to FIGS. 4 and 5.

Figure 4:
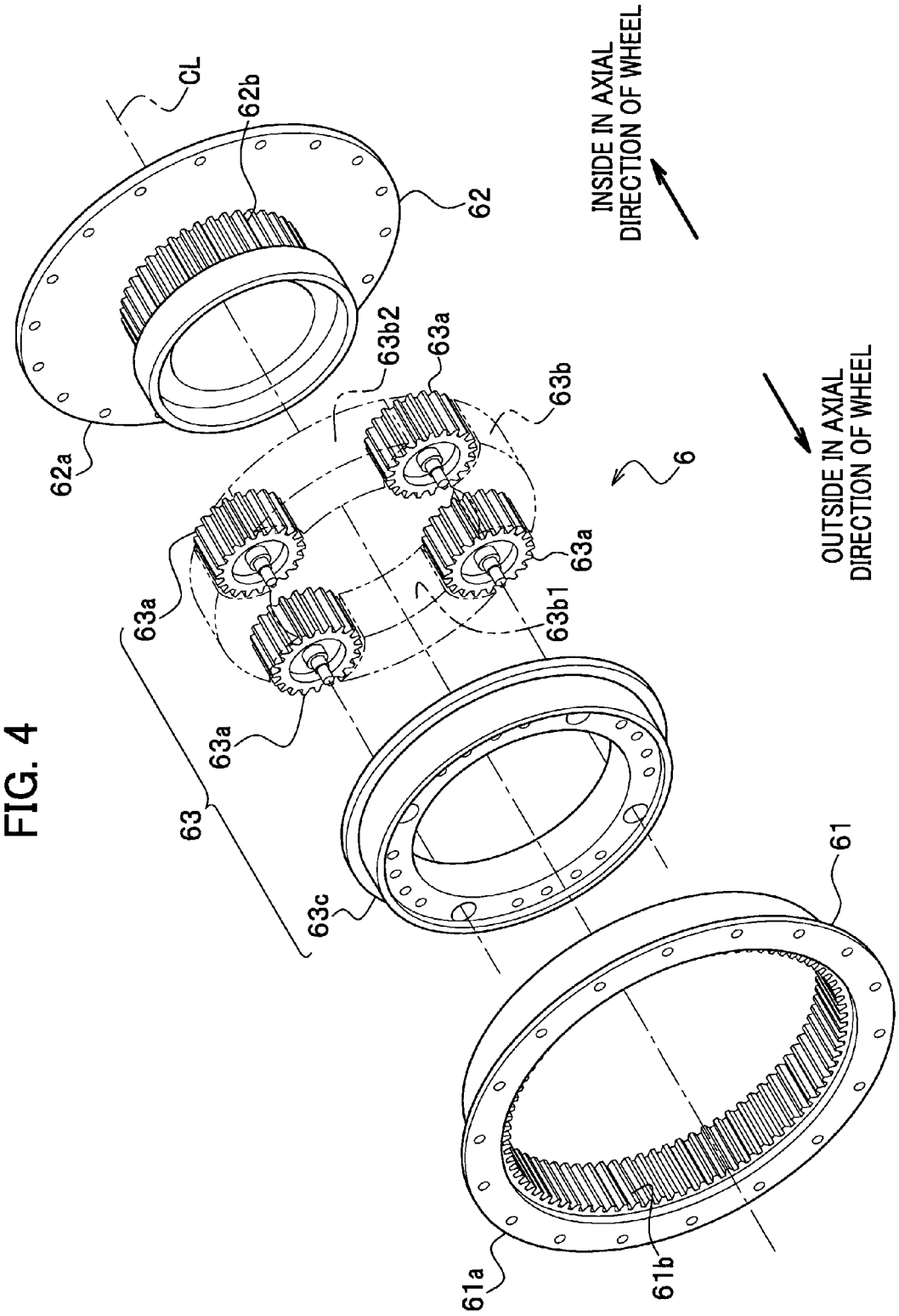
FIG. 4 is an exploded perspective view showing a structure of a planetary gear train according to an exemplary embodiment of the present invention.

The planetary gear train 6 includes, as shown in FIG. 4, an internal gear 61 fixed on the bottom plate 23a (see FIG. 3) of the outer case 23, a sun gear 62 fixed on the rotor 22 (see FIG. 3) to rotate together with the rotor 22, and a planet gear assembly 63 disposed to mesh with the sun gear 62 and the internal gear 61 to transmit a rotating force of the sun gear 62 to the hub 4 (see FIG. 2). These components of the planetary gear train 6 are accommodated within the width J (see FIG. 2) in the axial direction of the wheel 13. The planetary gear train 6 is disposed inwardly in the radial directions of the rotor 22, and positioned so that the planet gear assembly 63 is placed in the through hole 23b formed in the bottom plate 23a of the outer case 23 (see FIG. 2).

The internal gear 61 has a generally cylindrical shape (cylindrical body) with a flange 61a. The cylindrical body of the internal gear 61 is oriented so that its axis extends in the axial direction of the wheel 13 with inner and outer ends facing toward inside and outside of a vehicle body, respectively, when the wheel 13 is installed in the vehicle body. Internal gear teeth 61b are formed on an inner cylindrical surface of the cylindrical body of the internal gear 61 and arranged to mesh with planet gears 63a. The flange 61a of the internal gear 61 is shaped to radially outwardly project at the inner end from an outer cylindrical surface of the cylindrical body of the internal gear 61. The flange 61a is fixed on the bottom plate 23a of the outer case 23 (see FIG. 2).

The sun gear 62 has a generally cylindrical shape (cylindrical body) with a flange 62a. The cylindrical body of the sun gear 62 is oriented so that its axis extends in the axial direction of the wheel 13 with inner and outer ends facing toward inside and outside of the vehicle body, respectively, when the wheel 13 is installed in the vehicle body. External gear teeth 62b are formed on an outer cylindrical surface of the cylindrical body of the sun gear 62 and arranged to mesh with the planet gears 63a. The flange 62a of the sun gear 62 is shaped to radially outwardly project at the outer end from an outer cylindrical surface of the cylindrical body of the sun gear 62. The flange 62a is fixed on the rotor 22, and thus is rotated together with the rotor 22 about the spindle axis CL (see FIG. 2).

The planet gear assembly 63 includes four planet gears 63a, a case 63b, and an output disc 63c. The four planet gears 63a are allowed to rotate on their axis of rotation and to revolve around the external gear teeth 62b of the sun gear 62. The case 63b is adapted to accommodate the planet gears 63a in a manner that permits the planet gears 63a to rotate. The output disc 63c is adapted to couple the four planet gears 63a together. The planet gears 63a are installed in the case 63b in such a manner that their tooth surfaces protrude beyond an inner cylindrical surface 63b1 and an outer cylindrical surface 63b2. Accordingly, the planet gears 63a mesh with the external gear teeth 62b of the sun gear 62 at the inner cylindrical surface 63b1 side of the case 63b, and with the internal gear teeth 61b of the internal gear 61 at the outer cylindrical surface 63b2 side (see FIG. 5).

With this structure, the output disc 63c, which couples the four planet gears 63a together, rotates on the spindle axis CL in conjunction with revolution (orbital motion) of the planet gears 63a, and serves as an output part (shaft) of the planetary gear train 6.

Figure 5:
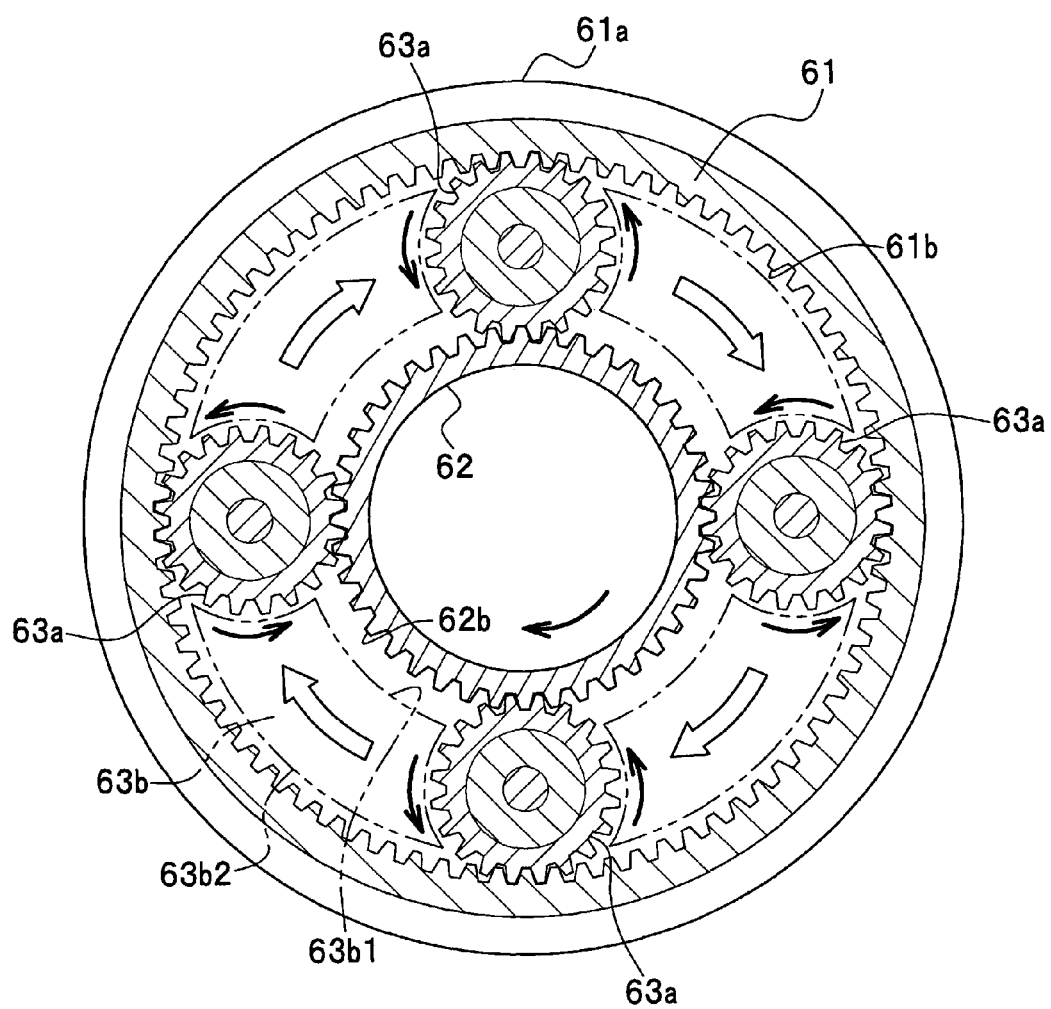
FIG. 5 is a sectional view for explaining an operation of a planetary gear train according to an exemplary embodiment of the present invention.

Specifically, when the sun gear 62 rotates clockwise as the rotor 22 rotates as shown in FIG. 5 while the internal gear 61 is fixed to the outer case 23 (see FIG. 2), the planet gears 63a rotates counterclockwise and revolves clockwise around the external gear teeth 62b of the sun gear 62.

When the planet gears 63a revolves clockwise around the external gear teeth 62b of the sun gear 62, the output disc 63c (see FIG. 4) rotates on the spindle axis CL (see FIG. 4) because the four planet gears 63a are coupled together by means of the output disc 63c so that the revolution of the planet discs 63a is synchronized with the rotation of the output disc 63c.

Figure 6:
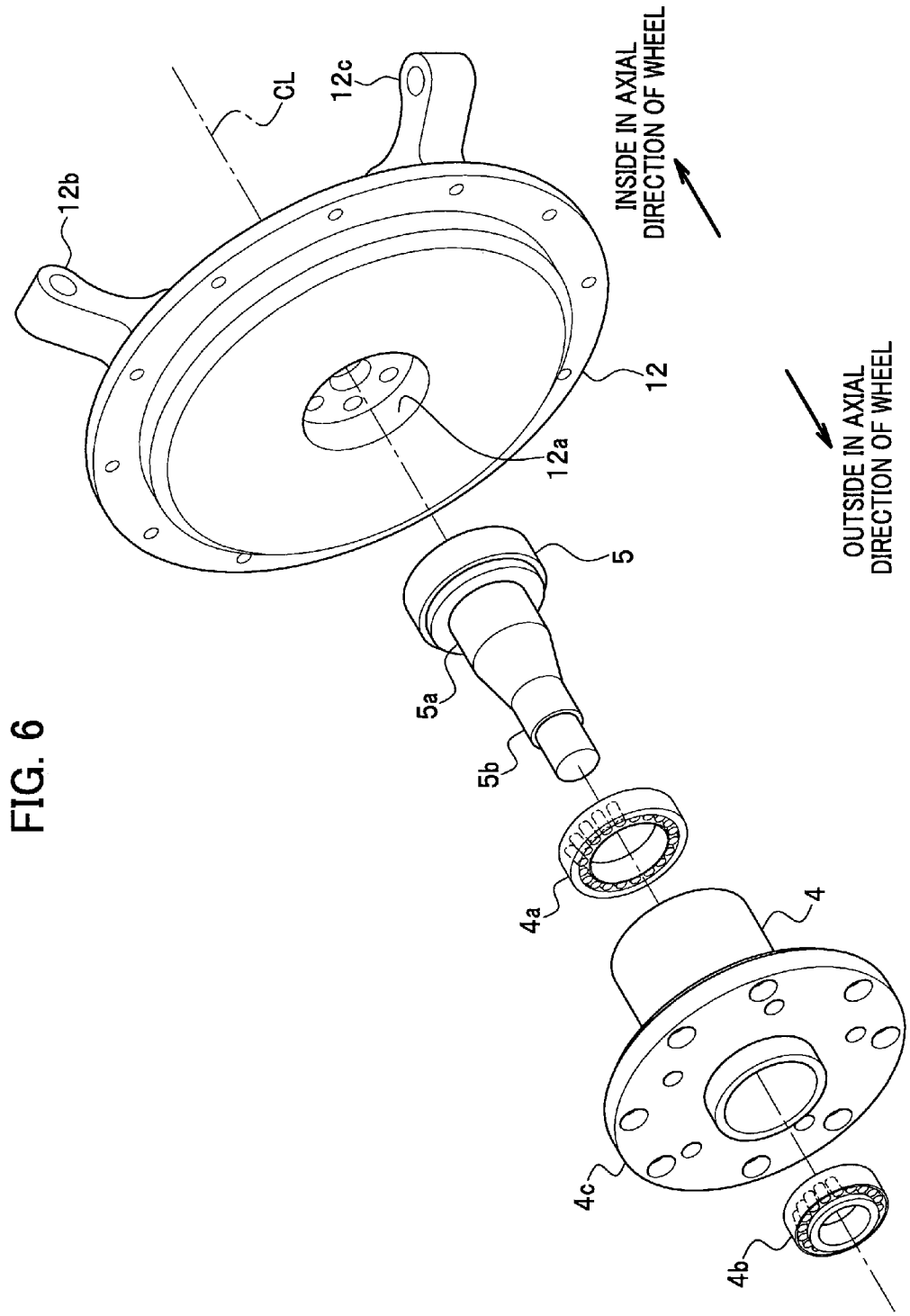
FIG. 6 is an exploded perspective view showing a structure of a portion around an axle shaft of an in-wheel motor vehicle according to an exemplary embodiment of the present invention.

Next, a structure of a portion of the wheel rotating device 1 which is connected with the vehicle body will be described with reference to FIG. 6, in which is shown a structure of a portion around an axle shaft of the in-wheel motor vehicle. The spindle 5 is, as shown in FIG. 6, coupled to the vehicle body through a knuckle 12. The hub 4 is rotatably fitted over the spindle 5 through the hub inner bearings 4b and the hub outer bearings 4b. The hub 4, hub inner bearings 4a, hub outer bearings 4b, spindle 5 and knuckle 12 are combined to form a so-called drive shaft system.

The knuckle 12 is shaped like a disc with a stepped hole 12a provided at its center so that the spindle 5 is fitted therein and fixed relative to each other. The knuckle 12 has two joint portions 12b and 12c. A suspension system SP (see FIG. 1) is coupled to the joint portion 12b, and a tie rod (not shown) for steering operation is coupled to the joint portion 12c.

Although the present embodiment has been described on the premise that the "MacPherson strut" type is adopted, the present invention is not limited thereto. Rather, it is to be understood that the present invention is applicable to any vehicle having the other type of suspension systems such as "double wishbone" type, etc. To be more specific, the type of suspension system to be used should vary according to the type of the vehicle; irrespectively, since the present embodiment adopts such a drive shaft system having a knuckle 12 and a spindle 5 as shown in FIG. 6, the knuckle 12 can be replaced without changing the motor 2 (see FIG. 2), and thus the in-wheel motor consistent with the present invention can be applicable to various types of suspension systems regardless of whether the wheel is a steerable wheel or a non steerable driving wheel. In addition, the shape and/or position of the joint portion 12b may be adapted as appropriate, and thus the kingpin angle and/or offset (scrub radius) can be set appropriately according to the requirements varying with the vehicle.

The spindle 5 is fitted in the center of the knuckle 12, and fastened thereto with bolts 12b (see FIG. 2). The spindle 5 has a larger-diameter portion 5a formed inside the vehicle and a reduced-diameter portion 5b formed outside the vehicle. The hub inner bearings 4a and the hub outer bearings 4b are attached to the larger-diameter portion 5a and the reduced-diameter portion 5b of the spindle 5, respectively, which support the hub 4 in a manner that permits the hub 4 to rotate.

The hub 4 has a cylindrical body with a flange 4c radially outwardly projecting from an outer end (in the axial direction of the wheel 13) of the cylindrical body. The hub 4 is coupled to the wheel 13 with hub bolts 14 and nuts (not shown), as shown in FIG. 1.

Figure 7:
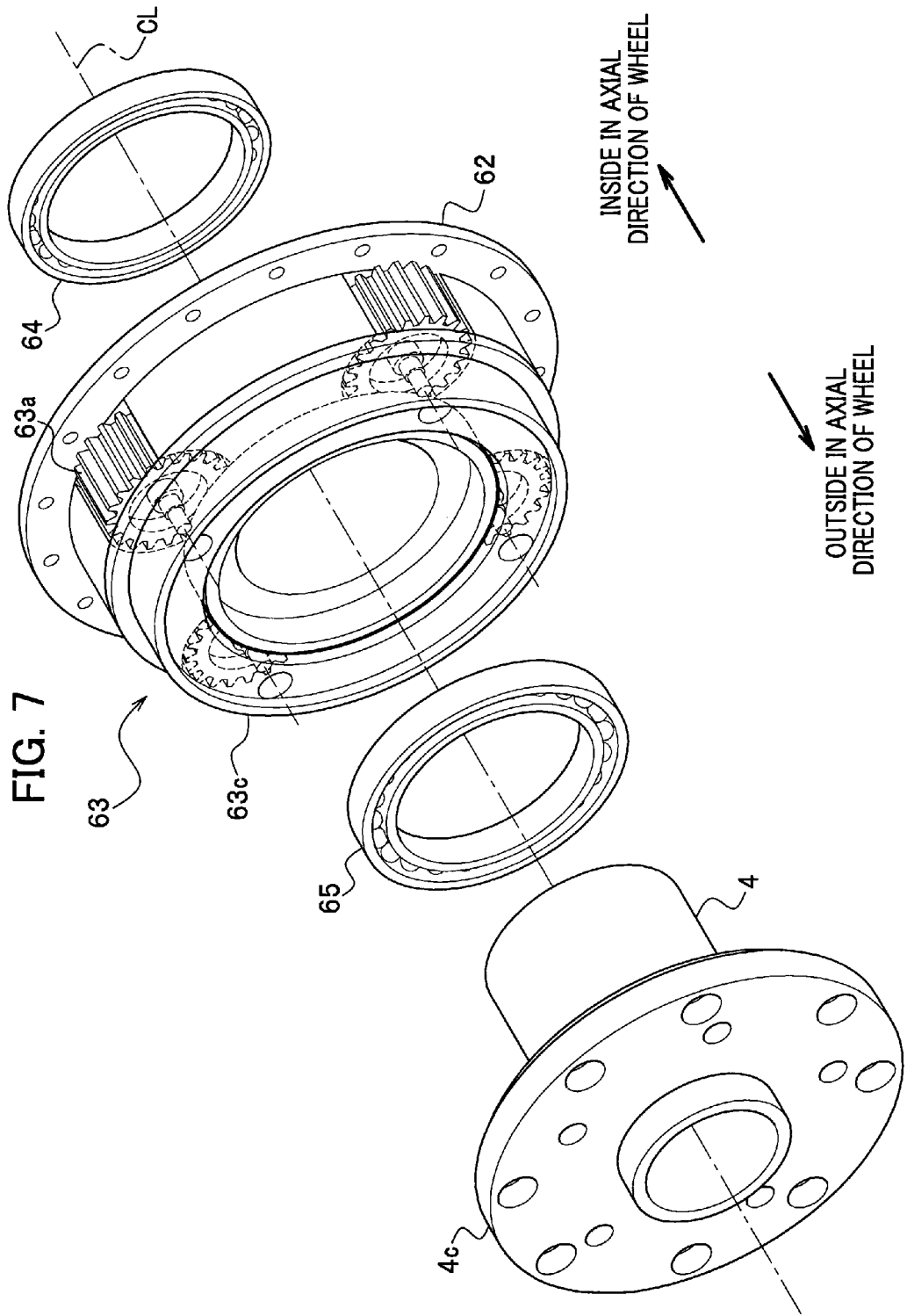
FIG. 7 is an exploded perspective view showing relationship between a hub and a planetary gear train according to an exemplary embodiment of the present invention.

The next discussion will focus on the relationship between the hub 4 and the planetary gear train 6 which will be explained with reference to FIG. 7. FIG. 7 is an exploded perspective view showing the relationship between the hub 4 and the planetary gear train 6.

As described above, the rotating force generated by the rotor 22 (see FIG. 2) is transmitted to the output disc 63c as an output part of the planetary gear train 6 with speeds reduced at a predetermined axle ratio (speed reduction ratio). On the other hand, the hub 4 is rotatably supported over the spindle 5 (see FIG. 2) through the hub inner bearings 4a and the hub outer bearings 4b. Accordingly, by coupling the hub 4 to the output disc 63c (output part of the planetary gear train 6), the rotating force of the rotor 22 can be transmitted to the wheel 13 through the hub 4, as shown in FIG. 2.

To be more specific, as shown in FIG. 7, the flange 4c of the hub 4 is fixed on the output disc 63c whereby the hub 4 and the output disc 63c are coupled together.

The sun gear 62 is rotatably supported over the outer cylindrical surface of the hub 4 through the gear inner bearings 64 and the gear outer bearings 65. Accordingly, as the sun gear 62 to which the rotor 22 is fixed rotates on the spindle axis CL, the rotor 22 is caused to rotate on the spindle axis CL through the sun gear 62.

Figure 8:
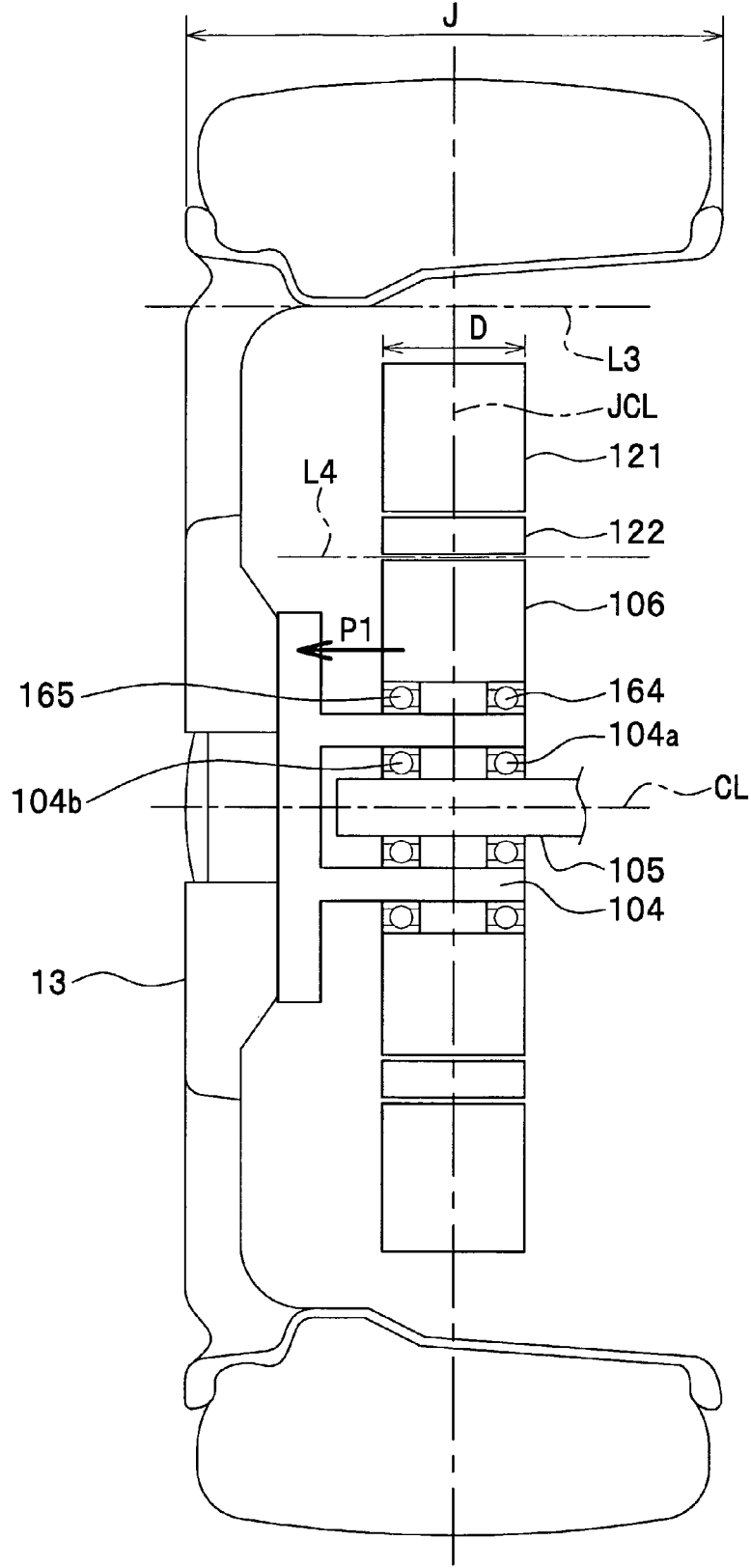
FIG. 8 is a sectional view schematically showing an arrangement of a stator, a rotor and a speed reducer in an "outer ring rotating type" drive shaft system according to an exemplary embodiment of the present invention.
Figure 9:
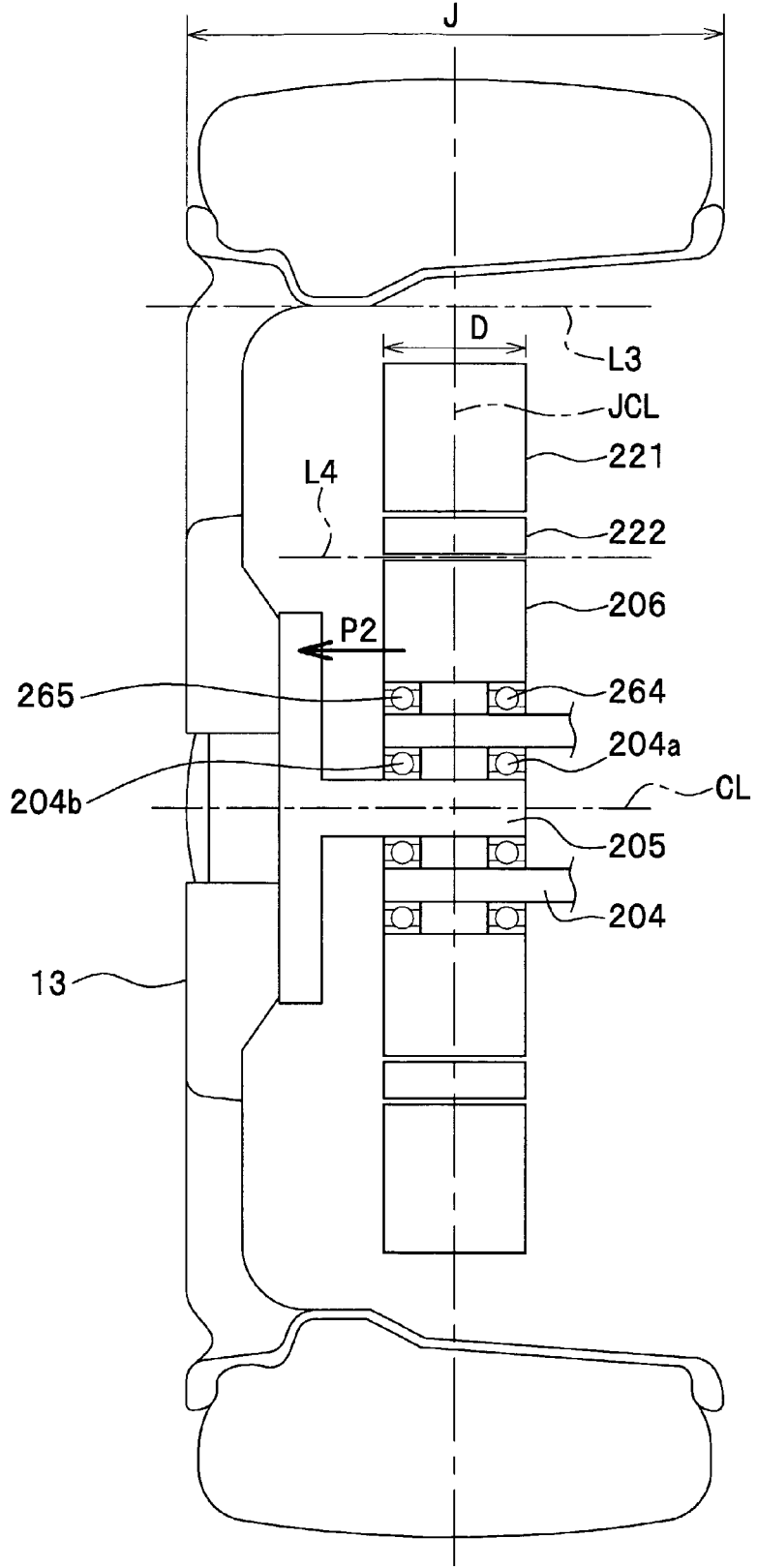
FIG. 9 is a sectional view schematically showing an arrangement of a stator, a rotor and a speed reducer in an "inner ring rotating type" drive shaft system according to an exemplary embodiment of the present invention.

Subsequently, an exemplary arrangement of the stator, rotor and speed reducer according to the present embodiment will be described with reference to FIGS. 8 and 9. FIG. 8 schematically shows, in section, an arrangement of the stator, rotor and speed reducer in an "outer ring rotating type" drive shaft system applicable to the wheel rotating device 1 consistent with the present invention. FIG. 9 schematically shows, in section, an arrangement of the stator, rotor and speed reducer in an "inner ring rotating type" drive shaft system applicable to the wheel rotating device 1 consistent with the present invention.

In the outer ring rotating type drive shaft system, as shown in FIG. 8, the spindle 105 is fixed to the vehicle body, and the hub 104 is rotatably fitted over the spindle 105 through hub inner bearings 104a and hub outer bearings 104b, to thereby couple the wheel 13 to the hub 104, while, in the inner ring rotating type drive shaft system, as shown in FIG. 9, a hub holder 204 is fixed to the vehicle body, and an axle shaft 205 is rotatably fitted in the hub holder 204, to thereby couple the wheel 13 to the axle shaft 205. The other structural features are common to these two types. The gear inner bearings 164, 264 and the gear outer bearings 165, 265 correspond to "bearings provided between the speed reducer and the hub" as defined in the appended claims.

The above difference between the two types results in transmission of the driving force; that is, the driving force is transmitted in the outer ring rotating type from a speed reducer 106 through the hub 104 to the wheel 13 (see an arrow P1 in FIG. 8), but transmitted in the inner ring rotating type from a speed reducer 206 through the axle shaft 205 to the wheel 13 (see an arrow P2 in FIG. 9).

Although the terms "hub holder" and "axle shaft" are customarily used to refer to the components designated by reference numerals 204 and 205, respectively, in the internal ring rotating type drive shaft system as shown in FIG. 9, these components 204 and 205 are substantially equivalent to the spindle 5 (FIG. 2) or 105 (FIG. 8) and the hub 4 (FIG. 2) or 104 (FIG. 8), respectively in the outer ring rotating type drive shaft system as shown in FIGS. 2 and 8. Accordingly, it is to be understood that the present invention is applicable to any in-wheel motor vehicles having either of the drive shaft system, outer ring rotating type or inner ring rotating type, similarly. The next discussion will be extended about arrangement of the stator, rotor and speed reducer in the outer ring rotating type drive shaft system by way of example.

In an exemplary embodiment of the present invention as shown in FIG. 8, starting from the hub 104 toward the outer circumference of the wheel 13, the speed reducer 106, the rotor 122 and the stator 121 are arranged in this sequence, and are aligned (with one another) in the radial directions of the wheel. In this embodiment, the speed reducer 106, the rotor 122 and the stator 121 have substantially the same width (or thickness) D in the axial direction of the motor. In this way, the thickness of the rotor 122, stator 121 and speed reducer 106 accommodated in the wheel 13 can be minimized. Since the width D of the rotor 122, the stator 121 and the speed reducer 106 in the axial direction of the motor is thinner in the axial direction than the width J in the axial direction of the wheel 13, the rotor 122, the stator 121 and the speed reducer 106 can be completely accommodated in the wheel 13.

In this embodiment, centers in axial directions of the speed reducer 106, the rotor 122 and the stator 121, respectively, which substantially coincide with the center of the width D, are substantially in alignment with a center line JCL centered in the axial direction of the wheel 13, and so positioned as to divide the width J. In this way, the center of gravity of the tire/wheel assembly in which a tire is fitted on the wheel 13 are made less deviated from the centers of gravity of the principal components, such as rotor 122, stator 121 and speed reducer 106, in the wheel 13. Consequently, the excessive load which would otherwise be exerted upon the drive shaft system due to such imbalanced centers of gravity can be lessened and the oscillations derived therefrom can be reduced.

In the present embodiment, the stator 121 and the rotor 122 are disposed outwardly in radial directions with respect to a center line L4 between a rotation center line CL of the wheel 13 and a bead seat line L3. By positioning the stator 121 outwardly in the radial directions with respect to the center line L4 between the rotation center line CL of the wheel 13 and the bead seat line L3, the stator 121 is located near the outer circumference of the wheel 13, so that the torque arm can be made as long as possible within the range of the restricted wheel diameters. Depending upon the type of wheel 13 and the vehicle in which the wheel 13 is mounted according to the present invention, however, it would still be preferable that the stator 121 only be disposed outwardly in the radial directions with respect to the center line L4.

A description will be given of an operation of the aforementioned wheel rotating device 1 for an in-wheel motor vehicle according to an exemplary embodiment of the present invention with reference to FIG. 2.

In the wheel rotating device 1 according to an exemplary embodiment of the present invention, when the stator 21 is supplied with alternating current, the rotor 22 is caused to rotate, and the rotating force of the rotor 22 is transmitted to the hub 4 with speeds reduced by the planetary gear train 6, so that the wheel coupled to the hub 4 is rotated to generate a driving force.

To be more specific, when the rotor 22 rotates, the sun gear 62 fastened with the rotor 22 rotates as well. Since the internal gear 61 is fixed to the outer case 23, the four planet gears 63a rotate and revolve around the sun gear 62 (see FIG. 5). Since the four planet gears 63a are coupled together with the output disc 63c (see FIG. 4), as the four planet gears 63a revolve, the output disc 63c rotates on the spindle axis CL.

On the other hand, the spindle 5 is coupled to the vehicle body through the knuckle 12. The hub 4 is fitted over the spindle 5 and rotatably supported through the hub inner bearings 4a and the hub outer bearings 4b. Since the output disc 63c is coupled to the hub 4, the hub 4 which rotates on the spindle axis CL causes the wheel 13 to rotate, to thereby generate a driving force.

In the present embodiment, as described above, the planetary gear train 6 is used to transmit the rotating force of the motor 2 to the hub 4 while reducing the speed with which the rotating force is transmitted. Therefore, the output efficiency can be enhanced and the driving performance (e.g., capacity for rapid acceleration) is improved while the motor 2 is miniaturized. More specifically, since the stator 21 is disposed inwardly in radial directions of the wheel 13 along the inner circumferential surface 13a of the wheel 13 and the rotor 22 is disposed inwardly in radial directions of the stator 21, the torque arm of the motor is extended, to thereby render the width in the axial direction of the motor 2 narrower.

Moreover, in the present embodiment, the planetary gear train 6 is disposed between the rotor 22 and the hub 4, and is accommodated within the width J in the axial direction of the wheel 13. Therefore, the motor 2 and the planetary gear train 6 are accommodated in the wheel 13, so that the motor 2 and the planetary gear train 6 are prevented from protruding from the wheel 13. This arrangement enhances flexibility of suspension geometry design of the vehicle. Thus-enhanced flexibility of suspension geometry design facilitates the application of the in-wheel motor to the steerable wheel, and makes it possible to easily enlarge the available space within the vehicle.

Although some exemplary embodiments of the present invention have been described above, the present invention is not limited thereto; rather, various modifications and changes may be made in the present invention without departing from the spirit and scope thereof.

For example, the embodiments in which the planetary gear train 6 is used for a speed reducer consistent with the present invention have been described above. However, the speed reducer consistent with the present invention is not limited thereto. A cycloidal gear reducer, a ball reducer or other types of speed reducer known in the art may be applied.

The planetary gear train 6 according to the above-exemplified embodiments is configured to include an internal gear 61 fixed to the outer case 23, a sun gear 62 to which the rotor 22 is fixed, and planet gears 63a such that the output power is derived from the revolution of the planet gears 63a. However, the planetary gear train 6 consistent with the present invention is not limited thereto; the planet gears 63a may be fixed, instead, so that the output power is derived from the internal gear 61.

In the above-exemplified embodiments, the motor 2 and the planetary gear train 6 are wholly accommodated within the width J in the axial direction of the wheel 13, but the present invention is not limited to this specific arrangement. Even such an embodiment that part of a motor case or the like is allowed to protrude from the wheel 13 may be considered to belong to the scope of the present invention.

The invention claimed is:

1. A wheel rotating device for an in-wheel motor vehicle, comprising:
    a motor including a stator and a rotor, to generate a rotating force;
    a speed reducer coupled to an output part of the motor;
    a hub coupled to an output part of the speed reducer; and
    a spindle fixed relative to a vehicle body, and supporting the hub in a manner that permits the hub to rotate,
    wherein the hub is coupled to a wheel to rotate the wheel, thereby generating a driving force,
    the stator of the motor is disposed inwardly in radial directions of the wheel along an inner circumferential surface of the wheel,
    the rotor of the motor is disposed inwardly in radial directions of the stator, and
    the speed reducer is disposed between the rotor and the hub with bearings provided between the speed reducer and the hub in a radial direction of the wheel.

2. The wheel rotating device according to claim 1, wherein among the stator, the rotor and the speed reducer, one of a dimension greatest in an axial direction of the motor is smaller in the axial direction than the wheel.

3. The wheel rotating device according to claim 1, wherein dimensions of the stator, the rotor and the speed reducer in an axial direction of the motor are substantially equal to one another.

4. The wheel rotating device according to claim 1, wherein the stator, the rotor and the speed reducer are aligned in the radial directions of the wheel.

5. The wheel rotating device according to claim 1, wherein centers in axial directions of the stator, the rotor and the speed reducer, respectively, are substantially in alignment with a center in an axial direction of the wheel.

6. The wheel rotating device according to claim 1, wherein the stator is disposed outwardly in radial directions with respect to a center line between a rotation center line of the wheel and a bead seat line.

7. The wheel rotating device according to claim 1, wherein the rotor is disposed outwardly in radial directions with respect to a center line between a rotation center line of the wheel and a bead seat line.

8. The wheel rotating device according to claim 1, wherein the speed reducer is one of a planetary gear train, a cycloidal gear reducer and a ball reducer.

9. The wheel rotating device according to claim 1, wherein the speed reducer comprises a planetary gear train which includes:
    an internal gear fixed to a motor case;
    a sun gear fixed to a rotor and disposed rotatably at an outside of the hub with gear bearings provided between the sun gear and the hub; and
    planet gears meshing with the sun gear and the internal gear to transmit the rotating force from the rotor to the hub.

10. The wheel rotating device according to claim 1, wherein the spindle is coupled to the vehicle body through a knuckle.

\* \* \* \* \*